United States Patent
Scheubel et al.

(10) Patent No.: US 9,382,161 B2
(45) Date of Patent: Jul. 5, 2016

(54) PROCESS USING NON-FIRED REFRACTORY PRODUCTS AS A LINING OF LARGE-VOLUME INDUSTRIAL FURNACES AND INDUSTRIAL FURNACES LINED WITH THE NON-FIRED REFRACTORY PRODUCTS

(71) Applicant: Refratechnik Holding GmbH, Ismaning (DE)

(72) Inventors: Bernd Scheubel, München (DE); Helge Jansen, Friedland (DE); Hans-Jürgen Klischat, Göttingen (DE); Rolf-Dieter Kizio, Gleichen (DE); Holger Wirsing, Göttingen (DE)

(73) Assignee: Refratechnik Holding GmbH, Ismaning (DE)

( * ) Notice: Subject to any disclaimer, the term of this patent is extended or adjusted under 35 U.S.C. 154(b) by 0 days.

(21) Appl. No.: 14/291,239

(22) Filed: May 30, 2014

(65) Prior Publication Data

US 2014/0261113 A1    Sep. 18, 2014

Related U.S. Application Data

(63) Continuation of application No. PCT/EP2013/074785, filed on Nov. 26, 2013.

(30) Foreign Application Priority Data

Nov. 29, 2012 (DE) .......................... 10 2012 023 318

(51) Int. Cl.
*C04B 35/03* (2006.01)
*C04B 35/04* (2006.01)
(Continued)

(52) U.S. Cl.
CPC ............. *C04B 35/0435* (2013.01); *C04B 33/04* (2013.01); *C04B 33/131* (2013.01);
(Continued)

(58) Field of Classification Search
CPC ....... C04B 35/043; C04B 35/03; C04B 35/047
USPC .................................. 501/121, 108, 109, 117
See application file for complete search history.

(56) References Cited

U.S. PATENT DOCUMENTS

| 1,992,482 | A | * | 2/1935 | Heuer | ..................... C04B 35/01 501/109 |
| 2,316,226 | A | | 4/1943 | Donley | |

(Continued)

FOREIGN PATENT DOCUMENTS

| AT | 171428 B | 5/1952 |
| BY | 7109 C1 | 5/2005 |

(Continued)

OTHER PUBLICATIONS

International Search Report of PCT/EP2013/074785, mailed Jan. 14, 2014.

(Continued)

*Primary Examiner* — Noah Wiese
(74) *Attorney, Agent, or Firm* — Collard & Roe, P.C.

(57) ABSTRACT

There is a process for creating graphite free non-fired refractory products, which are molded using presses and which includes using a plurality of different binders. The binders comprise a first binder for binding grains of granulation between room temperature and 400° C., a second binder binding the grains of granulation between 300 and 900° C.; and a third binder binding granulations of the refractory materials that enter into ceramic binding at temperatures above 900° C. This process is for producing at least one of magnesia chromite bricks, magnesia spinel and spinel bricks, magnesia zirconia and magnesia zircon bricks, magnesia hercynite and magnesia galaxite bricks, dolomite, dolomite-magnesia, and lime bricks, forsterite and olivine bricks, magnesia forsterite bricks, magnesia pleonast bricks, magnesia bricks. These products are configured to operate as a fire-side, refractory lining of large-volume industrial furnaces operated with an essentially oxidizing atmosphere, for the production of cement, lime, magnesia, and doloma.

50 Claims, 1 Drawing Sheet

(51) Int. Cl.
*C04B 35/043* (2006.01)
*C04B 35/057* (2006.01)
*C04B 35/06* (2006.01)
*C04B 35/44* (2006.01)
*C04B 35/443* (2006.01)
*C04B 35/66* (2006.01)
*F23M 5/00* (2006.01)
*C04B 33/04* (2006.01)
*C04B 33/13* (2006.01)
*C04B 35/047* (2006.01)
*C04B 35/101* (2006.01)
*C04B 35/103* (2006.01)
*C04B 35/18* (2006.01)
*C04B 35/20* (2006.01)
*C04B 35/42* (2006.01)
*C04B 35/565* (2006.01)
*C04B 35/63* (2006.01)
*C04B 35/632* (2006.01)
*C04B 35/634* (2006.01)
*F27D 1/00* (2006.01)

(52) U.S. Cl.
CPC ......... *C04B33/1305* (2013.01); *C04B 33/1315* (2013.01); *C04B 35/043* (2013.01); *C04B 35/047* (2013.01); *C04B 35/057* (2013.01); *C04B 35/06* (2013.01); *C04B 35/101* (2013.01); *C04B 35/103* (2013.01); *C04B 35/18* (2013.01); *C04B 35/20* (2013.01); *C04B 35/42* (2013.01); *C04B 35/44* (2013.01); *C04B 35/443* (2013.01); *C04B 35/565* (2013.01); *C04B 35/632* (2013.01); *C04B 35/6303* (2013.01); *C04B 35/634* (2013.01); *C04B 35/6306* (2013.01); *C04B 35/6316* (2013.01); *C04B 35/66* (2013.01); *F23M 5/00* (2013.01); *C04B 2235/5427* (2013.01); *C04B 2235/5436* (2013.01); *C04B 2235/604* (2013.01); *C04B 2235/721* (2013.01); *C04B 2235/96* (2013.01); *F23M 2900/05004* (2013.01); *F27D 1/0006* (2013.01); *Y10T 156/1089* (2015.01)

(56) References Cited

U.S. PATENT DOCUMENTS 4,021,254 A * 5/1977 Mortl ................ C04B 35/01
                                                    501/109
4,061,501 A * 12/1977 Ivarsson ............ C04B 28/24
                                                    501/118
4,169,734 A    10/1979 Brezny
4,279,845 A *  7/1981 Maisonnave ........ C21B 7/06
                                                    264/30
4,871,698 A * 10/1989 Fishler .............. C04B 35/597
                                                    501/100
5,073,525 A * 12/1991 Cheng ............... C04B 28/344
                                                    501/109
5,124,288 A *  6/1992 Ishikawa ............ C04B 35/03
                                                    266/286
5,185,300 A *  2/1993 Hoggard ............. B22D 41/18
                                                    501/102
6,548,435 B1    4/2003 Bugajski

FOREIGN PATENT DOCUMENTS

| BY | 7109 C1 | 6/2005 |
| CA | 1052398 A1 | 4/1979 |
| CN | 101066877 A | 11/2007 |
| CN | 101475391 A | 7/2009 |
| CN | 102775156 A | 11/2012 |
| EP | 0 003 761 A1 | 9/1979 |
| EP | 0 940 376 A1 | 9/1999 |
| EP | 1599697 B1 | 11/2005 |
| EP | 2 277 842 A1 | 1/2011 |
| GB | 607909 A | 9/1948 |
| RU | 2 239 612 C1 | 11/2004 |
| SU | 51938 A1 | 11/1937 |
| SU | 414235 A1 | 2/1974 |
| SU | 817009 A1 | 3/1981 |
| SU | 817011 A1 | 3/1981 |
| WO | 2014/031574 A1 | 2/2014 |

OTHER PUBLICATIONS

Routschka et al., Taschenbuch Feuerfeste Werkstoffe [Pocket book of refractory materials], 4th ed., 2007, Vulkan-Verlag GmbH, pp. 170-185, 196-235.
Routschka et al., Taschenbuch Feuerfeste Werkstoffe [Pocket book of refractory materials], 4th ed., 2007, Vulkan-Verlag GmbH, pp. 30-31.
Routschka et al., Praxishandbuch Feuerfeste Werkstoffe [Practice Book of refractory materials], 5th ed., 2011, Vulkan-Verlag GmbH, pp. 64-65, 104-105, 118-139, 156-177.
A Bulletin of the Association of German Cement Workers [Merkblatt WE-9 Verein Deutscher Zementwerke e.V.], [Association of German Cement Workers], Dusseldorf, May 1966, 10 pgs.
DIN EN 993-6, Apr. 1995, (10 pages).
DIN EN 993-5, Dec. 1998 (12 pages).

* cited by examiner

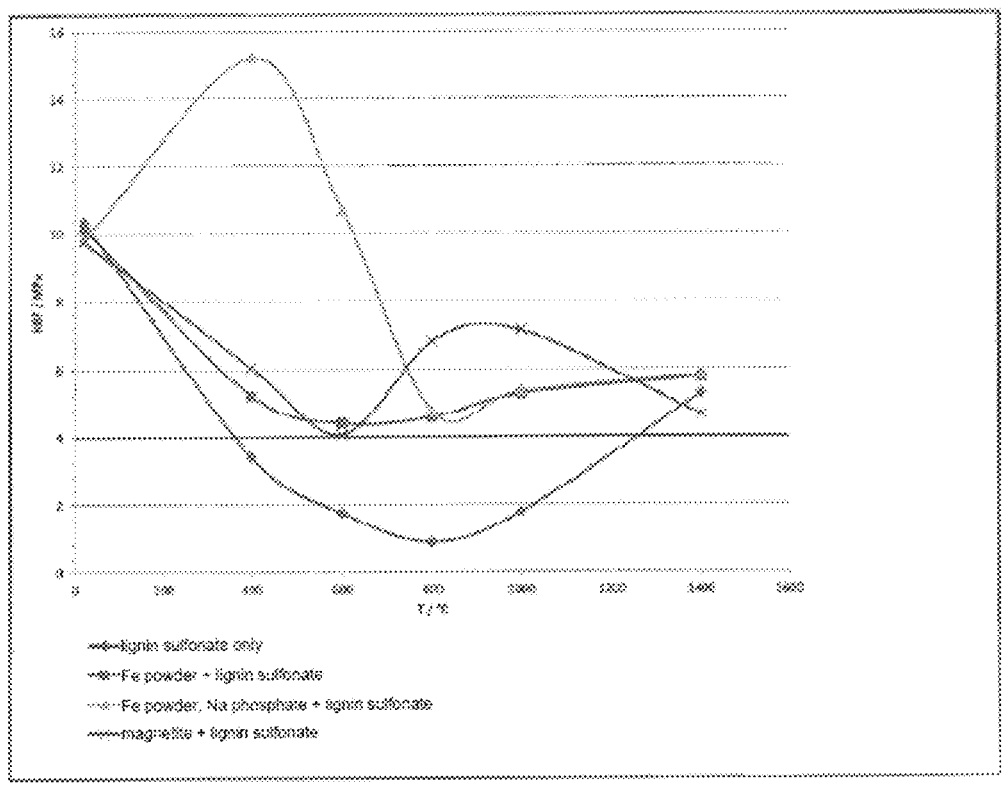

PROCESS USING NON-FIRED REFRACTORY PRODUCTS AS A LINING OF LARGE-VOLUME INDUSTRIAL FURNACES AND INDUSTRIAL FURNACES LINED WITH THE NON-FIRED REFRACTORY PRODUCTS

CROSS REFERENCE TO RELATED APPLICATIONS

This application is a continuation of PCT/EP2013/074785 filed on Dec. 10, 2013 which claims priority under 35 U.S.C. 119 from German Application Serial No. 10 2012 023 318.3 filed on Nov. 29, 2012 the disclosures of which are both hereby incorporated herein by reference in their entirety.

BACKGROUND

At least one embodiment of the invention relates to the use of non-fired refractory products in the form of pressed molded bodies or as a moldable or plastic mass or ramming castable to create refractory masonry—referred to hereinafter also as a liner or lining or lining—in a large-volume industrial furnace, in which cement, lime, magnesia or doloma are fired in an oxidizing or essentially oxidizing atmosphere. At least one embodiment of the invention furthermore relates to a large-volume industrial furnace resulting from such use. "Essentially oxidizing atmosphere" is supposed to mean that the masonry is impacted, during operation of an industrial furnace, predominantly with an oxidizing atmosphere over time, and only part of the time also with a neutral atmosphere.

Cement, lime, magnesia or doloma are fired in large-volume rotary kilns or shaft kilns, in an oxidizing or essentially oxidizing atmosphere; the lining of these kilns generally consists of fired refractory products.

In EP 1 599 697 A1, it is proposed to use non-fired bricks of refractory material to line large-volume industrial furnaces in the cement, lime, dolomite, and magnesite industry, which bricks contain carbon carriers in the form of graphite or soot and furthermore carbon resulting from carbonaceous binder in the fire-side surface region of the masonry of the lining. The bricks can consist of different refractory materials and can also demonstrate spinels, aside from MgO, among other things.

The carbon carriers, but particularly the graphite, impart undesirably high heat conductivity to the known bricks, so that measures must be taken for protection of the metallic kiln jacket that is always present. Furthermore, the graphite makes the refractory product more expensive. Also, graphite produces a smooth surface of the bricks, which hinders the bricklaying persons during the creation of a furnace lining, due to the risk of slipping. Furthermore, when an oxidizing atmosphere acts on the carbon sequestration of the brick for an extended period of time, the binding effect of the structure is already weakened at relatively low temperatures or actually lost, despite the presence of antioxidants that are supposed to protect the carbon against oxidation, and thereby the strength values of the structure of the bricks are significantly impaired.

AT 171428 B reports about the use of non-fired bricks made of non-acidic refractory material in rotary cement kilns, among other things, which bricks have compounds of magnesia with carbonic acid, as the result of $CO_2$ treatment, as binders.

Currently, large-volume industrial furnaces for the production of cement, lime, magnesia, and doloma are lined with fired refractory MgO-based and/or CaO-based products in the form of fired bricks. These fired bricks are magnesia chromite bricks,
magnesia spinel and spinel bricks,
magnesia zirconia and magnesia zircon bricks,
magnesia hercynite and magnesia galaxite bricks,
dolomite and dolomite-magnesia bricks,
forsterite and olivine bricks,
magnesia forsterite bricks,
magnesia pleonast bricks,
magnesia bricks.

(Gerald Routschka, Hartmut Wuthnow: Taschenbuch Feuerfeste Werkstoffe [Pocket Book of Refractory Materials], $4^{th}$ edition, 2007, Vulkan-Verlag [publishing company], pages 171 to 185 and 197 to 235).

In the field of refractory products, a distinction is made, in terms of classification, between magnesia spinel bricks, which have at least 40 mass-% MgO, and spinel bricks, which contain more than 20 mass-% and less than 40 mass-% MgO. Sintered spinels and melted spinels serve as raw materials.

Within the scope of use according to one embodiment of the invention, the mineralogical compositions of hercynite, galaxite, pleonast are considered to be part of the spinel group.

In general, refractory bricks that are composed of granulations of refractory materials require binding for the grains of the granulation, in order to maintain the shape of the bricks. At room temperature, an organic binder, composed, for example, of lignin sulfonate or an acidic starch solution or also of synthetic resin, is generally used to shape alkaline refractory bricks, e.g. on the basis of MgO for the cement industry.

After shaping by means of pressing, the pressed brick is stable in shape, can be handled and set onto furnace carriages. Subsequently, drying takes place, in order to remove the liquid water, and afterwards firing takes place. During this firing, which takes place in oxidizing manner, the organic binder is burned off. It is true that binder residues can be detected maximally up to temperatures of approximately 1000° C., but the binding force is lost starting at approximately 400° C. Therefore one also speaks of a temporary binder or temporary binding. Nevertheless, the strength of the brick is sufficient to bring it through the firing process. Ceramic sintering that imparts the strength for use in a lining of an industrial furnace to the fired brick starts, depending on the refractory material, at approximately 900° C.; the sintering speed then increases with the temperature and is also influenced by the firing duration. After firing, complete ceramic binding is then present over the entire brick structure, due to the sintering; organic components in the binding can no longer be found, because the carbon has been completely combusted.

The known fired refractory products mentioned above, which are currently in use, have the disadvantage that they are very complicated to produce, because a firing process must take place after pressing. Aside from the fact that this firing process is very energy-intensive, a great number of defects, namely what are called firing defects, can come about. In this connection, cracks, lumps, drips, and deformations, for example, should be mentioned. In addition, the non-homogeneity of the temperature distribution in the firing kiln, which naturally occurs, leads to different properties of the bricks, even though the composition of the green bricks before firing is the same, in each instance. Thus, undesirable variations in the brick properties, e.g. the strength, porosity, elasticity can come about. Furthermore, the dimensional stability of the bricks cannot be sufficiently guaranteed from one brick to another, because a change in the shape of the bricks occurs during firing, due to different shrinkage.

SUMMARY

It is the task of one embodiment of the invention to particularly avoid the disadvantages of the known refractory MgO-based and/or CaO-based fired and non-fired graphite-containing products, to the greatest possible extent, and to produce graphite-free refractory products having a correspondingly lower heat conductivity, with little effort, the dimensional stability of which can be guaranteed from one brick to another, and which guarantee sufficient structural strength for a refractory product in situ, in other words during fired operation of an industrial furnace, independent of temperature.

This task is accomplished by the characteristics of a process for the production of refractory linings of large-volume industrial furnaces which are operated with an oxidizing or essentially oxidizing atmosphere in which cement, lime, magnesia, or doloma is produced. The process comprises the steps of lining a fire-side of the industrial furnaces with non-fired graphite free refractory products in the form of pressed bricks or non-molded masses containing binders and granulations in each case of refractory raw materials entering into ceramic binding at temperatures above 900° C., whereby the refractory raw materials are in each case the same known raw materials from which usually the following fired brick types are produced.

These brick types can include magnesia chromite bricks, or magnesia spinel and spinel bricks, or magnesia zirconia and magnesia zircon bricks, or magnesia hercynite and magnesia galaxite bricks, or dolomite, dolomite-magnesia, and lime bricks, or forsterite and olivine bricks, or magnesia forsterite bricks, or magnesia pleonast bricks, or magnesia bricks, whereby the products contain at least a first temporary binder that guarantees binding of the grains of the granulation in a temperature range between room temperature and 500° C., and at least a second temporary binder that guarantees binding of the grains of the granulation in the temperature range between 300 and 1000° C., and whereby in the case of pressed bricks, the bricks have a cold pressure strength above 20 MPa. In at least one embodiment, the products have usual brick formats and have been pressed with pressing pressures between 50 and 250 MPa.

In at least one additional embodiment, the bricks have been pressed with pressing pressures between 80 and 200 MPa According to an embodiment of the invention, non-fired bricks composed of granulations of a refractory material or a mixture of at least two refractory materials, which were previously used for the fired bricks listed above, are used, and bricks are pressed from this. According to another embodiment of the invention, what are called non-molded refractory masses are furthermore produced from the granulations, and furnace wall regions are lined with them.

The refractory starting materials for the known fired refractory products listed above are known to a person skilled in the art. They are furthermore described in the pocket book indicated above, loc. cit. More precise information about specific compositions of the non-fired products according to at least one embodiment of the invention are not required within the scope of the invention, because the manufacturers use their own specific formulations and granulations for their refractory products. More precise information is also not expedient, within the scope of the present invention, because the important thing is not specific formulations, but rather the change in the formulations, according to one embodiment of the invention, with regard to the binders, and the press application, and, if applicable, also a temperature treatment after pressing.

Non-fired refractory materials or material mixtures for the fired bricks listed above are not suitable, according to the present state of knowledge, for producing bricks from them, under usual pressing conditions with regard to pressing pressure and pressing apparatus type, which bricks can be used in the non-fired state with regard to strength and reactions of the structure components in situ for firing of cement, lime, magnesia or doloma, for lining the said industrial furnaces, and guarantee the same refractory properties and other strength properties as the fired refractory products produced from them. This is due, for one thing, to production measures not adjusted in targeted manner such as, in particular, setting of suitable pressing pressures to be determined empirically, suitable drying, and suitable tempering. For another, however, it is also particularly due to the fact that the granulations do not have a combination, coordinated according to one embodiment of the invention, of multiple temperature-dependent types of binders, with which sufficient strength for handling ability and installation into a lining is guaranteed with at least a first temporary binder, generally already by means of drying and/or tempering after pressing, in a temperature range between 90 and 400, particularly between 150 and 300° C., and in which at least a second temporary binder is provided to guarantee sufficient strength in situ in a temperature range between 300 and 1000, particularly between 400 and 900° C. In even higher temperature ranges, the grains of the refractory materials enter into their ceramic binding as determined by the material.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 is a graph showing the correlation between the addition of additives such as iron powder to the mixture and its corresponding effect on the strength values of the products.

DETAILED DESCRIPTION

The non-fired refractory products according to at least one embodiment of the invention have to endure a significant temperature gradient present in their volume, in terms of strength, over a long time, or survive it without impairment, in situ, from their furnace interior side to their furnace jacket side; this gradient lies between high temperatures on the interior furnace lining side, e.g. 1500° C., and almost room temperature on the exterior lining side.

Fired bricks demonstrate ceramic binding throughout, because of the firing, and this does not cause any problems in situ.

During ceramic firing of the refractory material granulations to produce fired bricks, which firing is carried out in a ceramic kiln, a characteristic refractory structure is formed, generally starting at about 900° C., as ceramic binding, by means of sintering, conversion, reactions in the solid state, recrystallization, melt phase formation, and solution and precipitation processes, for example. The non-fired bricks according to one embodiment of the invention, produced with a first temporary binder, in contrast also ultimately generate ceramic binding and a structure that is generally the same as that of fired bricks, in a fire-side surface zone, in situ, in other words in the fired industrial furnace, by way of at least a second temporary intermediate binding step, but this is not always identical, because aside from the temperature and time (heat energy), the furnace atmosphere of the industrial furnace and the components of the raw materials for the production of cement, lime, magnesia, and doloma, which come into contact with the bricks, act on the minerals of the refractory materials of a fire-side surface zone of the non-fired bricks in situ.

It has surprisingly been shown that the influence of these industrial furnace parameters in situ, in interaction with a binder combination according to one embodiment of the invention, can make a significant contribution to improving the properties of the refractory non-fired products used according to one embodiment of the invention, as compared with the fired refractory products, which are the same in terms of materials. Obviously, these parameters, particularly the oxygen partial pressure, already influence the mineral structure of the ceramic binding that forms in situ, in the surface zone, in such a manner that no changes in the brick volume caused by mineralogy take place, for example, which could lead to brick destruction.

With one embodiment of the invention, non-fired bricks with usual brick formats are made available (pocket book, page 30, 31), which bricks demonstrate sufficient masonry-maintaining strength in situ, regardless of the temperature and temperature gradient to which they are exposed. Because the bricks are typically exposed to a temperature gradient, for example in cement kilns (hot side approximately 1450° C., cold side approximately 300° C.), their binding is coordinated in such a manner that sufficient strength is available in the entire brick at all times. On the hot side, which is generally exposed to temperatures >1200° C., and which demonstrates such temperatures in a hot side zone that is up to 5 cm thick, for example, sintering takes place during use, so that there, ceramic in situ binding occurs. In a cold-side zone, which demonstrates temperatures <400° C., for example, and can have a thickness of up to 5 cm, calculated from the brick base, for example, the temporary organic binding of the first binder makes its contribution to strength, it is therefore not temporary there, according to one embodiment of the invention, but rather permanent. As a result, the center zone that lies in between would fall into a "strength hole" because the temporary organic binding of the first binder is no longer present, and sintering cannot take place yet, if the second temporary binder according to one embodiment of the present invention were not present.

According to one embodiment of the invention, the following non-fired graphite-free refractory products, having at least a first temporary and at least a second temporary binder, are particularly used, particularly in the form of non-fired, mold-pressed molded bricks:
magnesia chromite,
magnesia spinel,
spinel,
magnesia zirconia,
magnesia zircon,
magnesia hercynite,
magnesia galaxite,
dolomite, dolomite-magnesia,
calcia,
forsterite,
olivine,
magnesia forsterite,
magnesia pleonast,
magnesia.

As was already explained above, the formulations, which are actually known, in each instance, can be used for the products, and every manufacturer can proceed from his usual formulations, so that no more precise information concerning the formulations needs to be provided for implementability of at least one embodiment of the invention.

It is essential that bricks are produced from the formulations by means of pressing, which bricks have pressure strengths above 20 MPa, preferably between 30 and 130 MPa, particularly between 40 and 120 MPa, very preferably between 50 and 100 MPa, preferably after thermal treatment after pressing, and resulting solidification by means of temporary binding produced by a first binder.

The strength values indicated are achieved, for example, by means of the following measures—individually or in combination:

a) Grain distribution of the material granulations
   Preferably, a grain distribution according to Fuller, Furnas or Litzow is aimed at. To increase the alternating temperature resistance, a known mixture gap can also be provided.

$b_1$) Shaping by means of pressing for bricks
   Preferably, hydraulic presses or spindle presses or blow forging presses or knee-lever presses or vacuum presses or isostatic presses or also vibration compaction machines are used, and pressing pressures between 50 and 250, particularly between 80 and 200 MPa, for example, are applied.

$b_2$) Mixture compaction when using non-molded masses, by means of vibration, stamping, shaking, for example.

c) Temperature treatment
   $c_1$) Drying
      The material/binder mixtures generally have fluid contents, for example from the binders and/or a water content, which are removed, preferably completely, by means of drying, particularly between 90 and 400° C., for example after pressing or after installation of the bricks in the industrial furnace or after installation of the non-molded masses into an industrial furnace, before the actual firing acts on them, or removed up to a residue of less than 0.8, particularly less than 0.5 wt.-%. This can include, depending on the application, the adhering moisture and, if applicable, the chemically bound water of crystallization.
   $c_2$) Tempering
      If the material/binder mixtures have corresponding temporary binders, which bring about their binder properties only by means of tempering, tempering takes place in temperature ranges below 1000° C., particularly between 200 and 800° C., before use in bricks or after creation of a lining in the case of non-molded masses.

d) Binder(s)
   At least a first temporary binder is used, which guarantees that sufficient strength of the non-fired bricks is maintained so that they can be handled at room temperature after temperature treatment and up to 400° C. or even 500° C., for example, in the total brick, at least until the onset of the binding effect of a second temporary binder, in situ at higher temperatures, for example in the temperature range between 300 and 1000° C. (or even a range of 400-900° C. The second temporary binder guarantees sufficient strength values until ceramic binding takes effect, which generally occurs at 900° C. It is plausible that the temperature ranges with regard to the final binding effect of the first temporary binder overlap or can overlap with the temperature ranges of the second temporary binder, and the temperature range of the second temporary binder overlap or can overlap with the start of ceramic binding. The term "temporary" means that the binding of the binder is lost when higher temperatures, for example above 400° C., are in effect for the first binder, and it can be lost above 900° C., particularly above 1000° C., for example, for the second binder, or when ceramic binding occurs.

With the usual grain distributions and with the binder combinations according to at least one embodiment of the invention, the material/binder mixtures can be used specifically not just as shaped bricks, but also as stamped or shaken masses or as ramming castables or vibration masses, in the said large-volume industrial furnaces, whereby the strength of the masses corresponds to the strength values of the shaped bricks after the effect of temperatures of the temperature treatment, which can particularly be achieved also on location by means of the measures according to a), $b_2$), d), as well as $c_1$) and/or $c_2$).

At least one binder from the following group is used, according to at least one embodiment of the invention, as a first temporary binder:
lignin sulfonate, synthetic resin, tar, pitch, novolac, dextrin, usual organic acids (e.g. citric acid, malic acid, acetic acid), polyvinyl alcohol, gum arabic, saccharide preparations, as well as mixtures thereof, particularly also with phosphoric acid and/or phosphates,
whereby particularly, at least one binder from the following group:
lignin sulfonate, synthetic resin, organic acids, polyvinyl alcohol, particularly also mixtures with phosphoric acid and/or phosphates,
and very particularly from the following group:
lignin sulfonate, synthetic resin, particularly also mixtures with phosphoric acid and/or phosphates
is used.

At least one binder from the following group is used as a second temporary binder:
the metal powders Al, Mg, Si, Fe and their alloys, SiC, $B_4C$, $Si_3N_4$, AlN, BN, sialon, fine-grained mineral materials, e.g. MgO, spinel, alumina, zircon oxide, silicon dioxide, especially micro-silica, calcium aluminates, aluminum silicates and clays, compounds containing iron, especially compounds containing iron oxide, e.g. magnetite, hematite, goethite, limonite, siderite,
whereby in particular, at least one binder from the following group:
Al, Mg, Si, Fe, fine-grained mineral materials, e.g. spinel, alumina, zircon oxide, compounds containing iron, e.g. magnetite, hematite,
and very particularly from the following group:
Al, Fe, mineral materials, e.g. alumina, zircon oxide, compounds containing iron, e.g. magnetite, hematite
is used.

The first temporary binder is generally used as a liquid and also as a power additive, and then with a fineness <150 µm, particularly <90 µm, and, in this connection, particularly in amounts between 0.5 and 8 wt.-%, particularly between 1 and 4 wt.-% with reference to the dry granulations of the refractory materials.

The second temporary binder is used with a fineness <150 µm, particularly <90 µm, and, in this connection, particularly in amounts between 0.5 and 15 wt.-%, particularly between 1 and 10 wt.-% with reference to the dry granulations of the refractory materials.

Because the bricks for the large-volume industrial furnace no longer need to be fired, the brick properties are essentially more homogeneous. The strength of these products, in use over the long term, lies higher, in part, than in the case of fired products. The disadvantages of the fired bricks can be avoided. Significant dimensional stability can be guaranteed, because the firing defects are avoided, resulting in the fact that installation of the bricks is decisively simplified. In addition, a significant energy saving results from the use of non-fired bricks and the moldable masses.

The usability, according to at least one embodiment of the invention, of the selected, non-fired, refractory, molded and non-molded refractory products can also be transferred to the other types of bricks usually used in certain zones of the said large-volume industrial furnaces, e.g. composed of chamotte or SiC+andalusite or SiC+kaolin or bauxite or bauxite+SiC or andalusite or mullite or mullite+SiC.

In order to quantify the binder bindings, which are graduated by temperature, magnesia spinel bricks are produced as examples. Mixtures on the basis of magnesia and spinel, which follow a grain size distribution according to Fuller, are mixed with the first temporary organic binder lignin sulfonate and with a second temporary binder in the form of metal powders and phosphate binders, and the mixture is pressed into bricks with a pressing pressure of 130 MPa and the dimensions of a cement kiln brick B622 (according to Merkblatt [Bulletin] WE 9, Verein Deutscher Zementwerke [Association of German Cement Works], Düsseldorf, May 1966). Subsequently, these bricks are fired at different temperatures, namely at 400, 600, 800, 1000, 1400° C. After cooling, the cold bending strength (KBF) is determined according to DIN EN 993-6, as a measure of binding of the structure. If sufficient binding is not present, the cold bending strength is <1 MPa, i.e. the brick breaks rapidly and is unsuitable for use. If, in contrast, binding that meets the demands in a rotary cement kiln, for example, is formed, then a strength is obtained that should lie in the range of the cold bending strength of fired bricks, in other words >4 MPa for all temperatures in the test.

The cold pressure strength (KDF) according to DIN EN 933-5 follows a similar trend, whereby this variable describes the binding in the structure with less accuracy.

The properties of the bricks are shown in the following table.

| | | | | | |
|---|---|---|---|---|---|
| Magnesia sinter | 84 | 81 | 79 | 79 | Wt.-% |
| Spinel | 16 | 16 | 16 | 16 | Wt.-% |
| Magnetite | — | — | — | 5 | Wt.-% |
| Iron powder | — | 3 | 3 | — | Wt.-% |
| Na phosphate | — | — | 2 | — | Wt.-% |
| Lignin sulfonate | 3.9 | 3.9 | 3.9 | 3.9 | Wt.-% |
| Density | 3.08 | 3.05 | 3.08 | 3.06 | g/cm³ |
| KBF 20° C. | 10.33 | 10.14 | 9.83 | 9.74 | MPa |
| KBF 400° C. | 3.41 | 5.22 | 15.21 | 6.04 | MPa |
| KBF 600° C. | 1.74 | 4.42 | 10.68 | 4.08 | MPa |
| KBF 800° C. | 0.89 | 4.59 | 4.74 | 6.83 | MPa |
| KBF 1000° C. | 1.78 | 5.28 | 5.35 | 7.13 | MPa |
| KBF 1400° C. | 5.28 | 5.77 | 5.83 | 4.65 | MPa |
| KDF 20° C. | 91.10 | 89.13 | 112.30 | 115.25 | MPa |
| KDF 400° C. | 47.30 | 96.55 | 78.50 | 135.15 | MPa |
| KDF 600° C. | 20.45 | 57.75 | 55.50 | 110.30 | MPa |
| KDF 800° C. | 7.75 | 54.70 | 52.40 | 74.40 | MPa |
| KDF 1000° C. | 15.25 | 75.05 | 78.12 | 83.50 | MPa |
| KDF 1400° C. | 70.65 | 97.31 | 81.17 | 73.77 | MPa |

The table, just like FIG. 1 created from the values of the table, clearly shows the positive effect of the addition of iron powder (as a representative for Al, Mg, Si, Fe, and their alloys), by means of which the strength values (column 2) can be significantly increased as compared with bricks bound only with lignin sulfonate after temperature treatment (column 1). The same effect is achieved by means of adding fine-particle mineral material≤150 μm, preferably ≤90 μm, here represented by magnetite, by means of which the strength values (column 4) can be significantly increased as compared with bricks bound only with lignin sulfonate after temperature treatment (column 1). The addition of sodium phosphate additionally increases the strength values (column 3).

While the bricks bound only with lignin sulfonate therefore demonstrate significant weaknesses in the temperature range between 400° C. and 1000° C. (ceramic sintering becomes clear from the high strength value of the bricks at 1400° C.), all the other bricks demonstrate strength values that lie above the minimum value of the cold pressure strength of 4 MPa of fired bricks, over all the temperatures, FIG. 1.

FIG. 1 also shows that further potential also exists in additional combinations of the said binders, for example by means of the joint addition of magnetite, Fe powder, and sodium phosphate, which further increases the strength at approximately 800° C.

Thus there is disclosed in at least one embodiment of the invention there is the use of non-fired refractory products, free of carbon carriers, particularly molded using presses or not molded, containing binders and, in each instance, granulations of the refractory materials that enter into ceramic binding at temperatures above 900° C., for the production of:
  magnesia chromite bricks,
  magnesia spinel and spinel bricks,
  magnesia zirconia and magnesia zircon bricks,
  magnesia hercynite and magnesia galaxite bricks,
  dolomite, dolomite-magnesia, and lime bricks,
  forsterite and olivine bricks,
  magnesia forsterite bricks,
  magnesia pleonast bricks,
  magnesia bricks,
as a fire-side, refractory lining of large-volume industrial furnaces operated with an oxidizing or essentially oxidizing atmosphere, for the production of cement, lime, magnesia, and doloma, in the form of pressed bricks or non-molded masses, wherein the bricks have a cold pressure strength above 20 MPa, and the products contain at least a first temporary binder that guarantees binding of the grains of the granulation in a temperature range between room temperature and 500° C., and at least a second temporary binder that guarantees binding of the grains of the granulation in the temperature range between 300 and 1000° C.

Accordingly, while at least one embodiment of the present invention has been shown and described, it is obvious that many changes and modifications may be made thereunto without departing from the spirit and scope of the invention.

The invention claimed is:

1. A process for the production of refractory linings of large-volume industrial furnaces operated with an oxidizing or essentially oxidizing atmosphere in which cement, lime, magnesia, or doloma is produced, comprises the following steps:
  lining a fire-side of the industrial furnaces with non-fired graphite free refractory products in the form of pressed bricks containing binders and granulations in each case of refractory raw materials entering into ceramic binding at temperatures above 900° C., whereby the refractory raw materials are in each case the same known raw materials from which usually the following fired brick types are produced
    magnesia chromite bricks,
    or
    magnesia spinel and spinel bricks,
    or
    magnesia zirconia and magnesia zircon bricks,
    or
    magnesia hercynite and magnesia galaxite bricks,
    or
    dolomite, dolomite-magnesia, and lime bricks,
    or
    forsterite and olivine bricks,
    or
    magnesia forsterite bricks,
    or
    magnesia pleonast bricks,
    or
    magnesia bricks,
    whereby the products contain at least a first temporary binder that guarantees binding of the grains of the granulation in a temperature range between room temperature and 500° C., and at least a second temporary binder that guarantees binding of the grains of the granulation in the temperature range between 300 and 1000° C., and
  whereby the pressed bricks have a cold pressure strength above 20 MPa.

2. The process according to claim 1, wherein the refractory raw materials enter into ceramic binding at temperatures above 1000° C.

3. The process according to claim 1, wherein the first temporary binder that guarantees binding of the grains of the granulation in a temperature range between room temperature and 400° C.

4. The process according to claim 1, wherein the second temporary binder that guarantees binding of the grains of the granulation in the temperature range between 400 and 900° C.

5. The process according to claim 1, wherein the bricks have a cold pressure strength between 30 and 130 MPa.

6. The process according to claim 1, wherein the bricks have a cold pressure strength between 40 and 120 MPa.

7. The process according to claim 1, wherein the granulations have a grain distribution according to Litzow, Fuller or Furnas.

8. The process according to claim 1, wherein the products have usual brick formats and have been pressed with pressing pressures between 50 and 250 MPa.

9. The process according to claim 8, wherein the bricks have been pressed with pressing pressures between 80 and 200 MPa.

10. The process according to claim 1, wherein the products are treated before use at temperatures between 90 and 400° C., to liquid contents below 0.8 wt.-%.

11. The process according to claim 10, wherein the products are treated before use at temperatures between 100 and 350° C.

12. The process according to claim 10, wherein the products are treated to liquid contents below 0.5 wt.-%.

13. The process according to claim 1, wherein the products are tempered in temperature ranges below 1000° C., before use or in situ.

14. The process according to claim 13, wherein the products are tempered in temperature ranges between 200 and 800° C., before use or in situ.

15. The process according to claim 1, wherein a binder from the following group is contained as a first temporary binder:

lignin sulfonate, synthetic resin, tar, pitch, novolac, dextrin, organic acids, polyvinyl alcohol, gum arabic, saccharide preparations, as well as mixtures thereof.

16. The process according to claim 15, wherein the first temporary binder also contains phosphoric acid and/or phosphates and, in this connection, in the case of a powder additive, with fineness values <150 μm.

17. The process according to claim 16, wherein the first temporary binder contains the phosphoric acid and/or phosphates as a liquid in amounts between 0.5 and 8 wt.-% with reference to the dry material or the dry mixture of refractory materials.

18. The process according to claim 16, wherein the powder additive has a fineness value of <90 μm.

19. The process according to claim 1, wherein at least one binder from the following group is contained as a second temporary binder:
Al, Mg, Si, Fe and their alloys, SiC, $B_4C$, $Si_3N_4$, AlN, BN, sialon, fine-grained mineral materials, spinel, alumina, zircon oxide, silicon dioxide, calcium aluminates, aluminum silicates and clays, compounds containing iron.

20. The process according to claim 19, wherein the secondary temporary binder is selected from the group consisting of MgO, micro-silica, and compounds containing iron oxide.

21. The process according to claim 20, wherein the compounds containing iron oxide are selected from the group consisting of magnetite, hematite, goethite, limonite, and siderite.

22. The process according to claim 19, wherein the secondary temporary binder is in amounts between 0.5 and 15%, with reference to the dry material or the dry mixture of refractory materials, and, in this connection with fineness values <150 μm.

23. The process according to claim 22, wherein the secondary binder is contained in amounts between 1 and 4%.

24. The process according to claim 23, wherein the fineness values are <90 μm.

25. The process according to claim 15, wherein the organic acids are selected from the group consisting of citric acid, malic acid, and acetic acid).

26. A process for the production of refractory linings of large-volume industrial furnaces operated with an oxidizing or essentially oxidizing atmosphere in which cement, lime, magnesia, or doloma is produced, comprises the following steps:
lining a fire-side of the industrial furnaces with non-fired graphite free refractory products in the form of pressed bricks containing binders and granulations in each case of refractory raw materials entering into ceramic binding at temperatures above 900° C., whereby the refractory raw materials are in each case the same known raw materials from which usually the following fired brick types are produced:
chamotte bricks,
or
bricks on the basis of SiC+andalusite,
or
bricks on the basis of SiC+kaolin,
or
bricks on the basis of bauxite,
or
bricks on the basis of bauxite+SiC,
or
bricks on the basis of andalusite,
or
bricks on the basis of mullite,
or
bricks on the basis of mullite+SiC,
whereby the products contain at least a first temporary binder that guarantees binding of the grains of the granulation in a temperature range between room temperature and 500° C., and at least a second temporary binder that guarantees binding of the grains of the granulation in the temperature range between 300 and 1000° C., and
whereby the pressed bricks have a cold pressure strength above 20 MPa.

27. The process according to claim 26, wherein the refractory raw materials enter into ceramic binding at temperatures above 1000° C.

28. The process according to claim 26, wherein the first temporary binder guarantees binding of the grains of the granulation in a temperature range between room temperature and 400° C.

29. The process according to claim 26, wherein the second temporary binder guarantees binding of the grains of the granulation in the temperature range between 400 and 900° C.

30. The process according to claim 26, wherein the bricks have a cold pressure strength between 30 and 130 MPa.

31. The process according to claim 26, wherein the bricks have a cold pressure strength between 40 and 120 MPa.

32. The process according to claim 26, wherein the granulations have a grain distribution according to Litzow, Fuller or Furnas.

33. The process according to claim 26 the products have usual brick formats and have been pressed with pressing pressures between 50 and 250 MPa.

34. The process according to claim 33, wherein the bricks have been pressed with pressing pressures between 80 and 200 MPa.

35. The process according to claim 26, wherein the products are treated before use at temperatures between 90 and 400° C.

36. The process according to claim 35, wherein the products are treated before use at temperatures between 100 and 350° C.

37. The process according to claim 35, wherein the products are treated to liquid contents below 0.5 wt.-%.

38. The process according to claim 26, the products are tempered in temperature ranges below 1000° C., before use or in situ.

39. The process according to claim 38, wherein the products are tempered in temperature ranges between 200 and 800° C., before use or in situ.

40. The process according to claim 26, wherein a binder from the following group is contained as a first temporary binder:
lignin sulfonate, synthetic resin, tar, pitch, novolac, dextrin, organic acids polyvinyl alcohol, gum arabic, saccharide preparations, as well as mixtures thereof.

41. The process according to claim 40, wherein the organic acids are selected from the group consisting of citric acid, malic acid, and acetic acid.

42. The process according to claim 40, wherein the first temporary binder also contains phosphoric acid and/or phosphates and, in this connection, in the case of a powder additive, with fineness values <150 μm.

43. The process according to claim 42, wherein the first temporary binder contains the phosphoric acid and/or phosphates as a liquid in amounts between 0.5 and 8 wt.-% with reference to the dry material or the dry mixture of refractory materials.

44. The process according claim 42, wherein the powder additive has a fineness value of <90 μm.

45. The process according to claim 26, wherein at least one binder from the following group is contained as a second temporary binder:

Al, Mg, Si, Fe and their alloys, SiC, $B_4C$, $Si_3N_4$, AlN, BN, sialon, fine-grained mineral materials, spinel, alumina, zircon oxide, silicon dioxide, calcium aluminates, aluminum silicates and clays, compounds containing iron.

46. The process according to claim 45, wherein the secondary temporary binder is selected from the group consisting of MgO, micro-silica, and compounds containing iron oxide.

47. The process according to claim 46, wherein the compounds containing iron oxide are selected from the group consisting of magnetite, hematite, goethite, limonite, and siderite.

48. The process according to claim 45, wherein the secondary temporary binder is in amounts between 0.5 and 15%, with reference to the dry material or the dry mixture of refractory materials, and, in this connection with fineness values <150 μm.

49. The process according to claim 48, wherein the secondary binder is contained in amounts between 1 and 4%.

50. The process according to claim 49, wherein the fineness values are <90 μm.

\* \* \* \* \*